J. B. CROWELL.
Fertilizer.
No. 2,011. Reissued June 27, 1865.
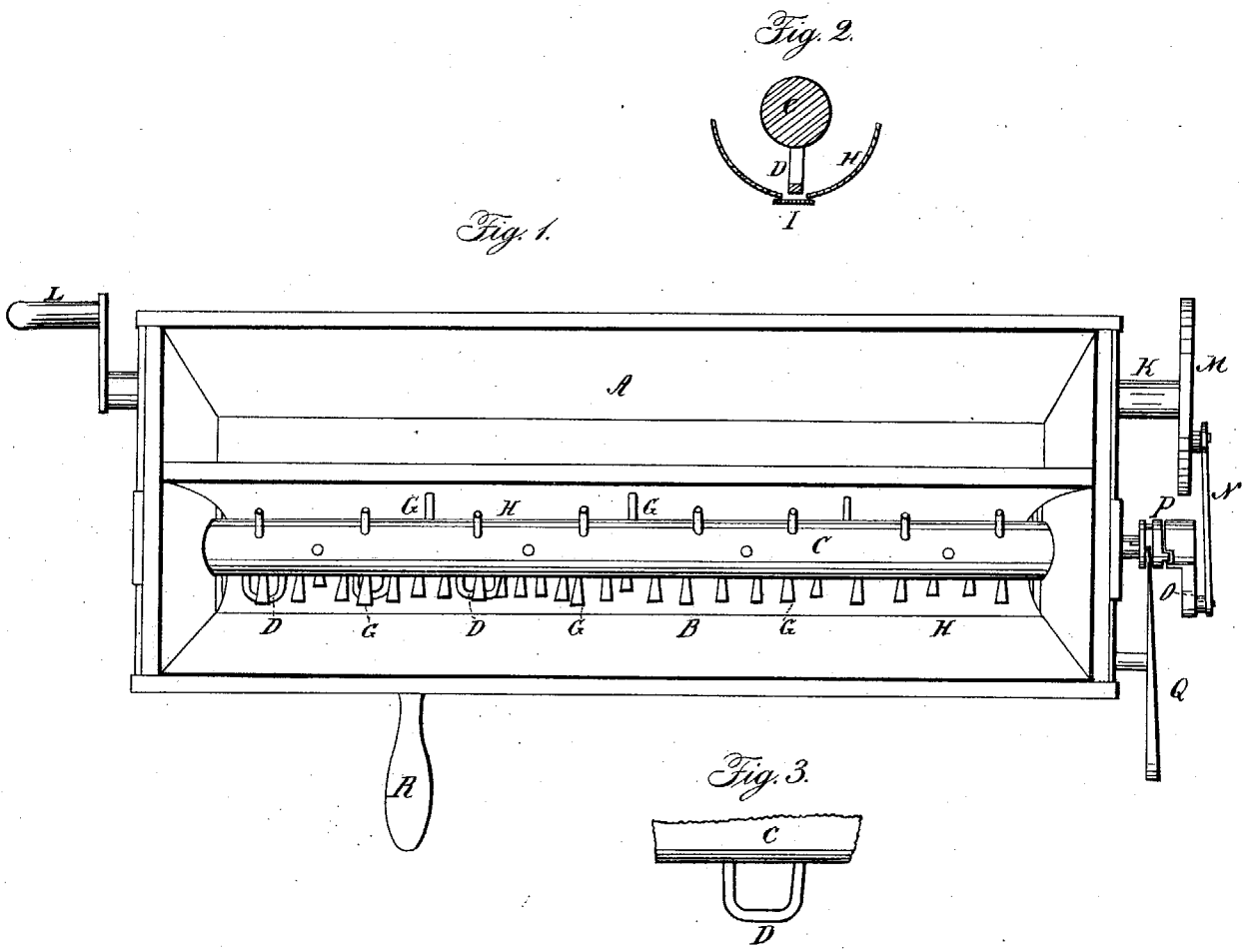
Witnesses:
G. Bread
M. Robinson
Inventor:
Jacob B Crowell
per
Daniel Breed Atty
AM. PHOTO-LITHO. CO. N.Y. (OSBORNE'S PROCESS.)

UNITED STATES PATENT OFFICE.

JACOB B. CROWELL, OF GREENCASTLE, PENNSYLVANIA.

IMPROVEMENT IN WHEAT-DRILLS.

Specification forming part of Letters Patent No. 38,949, dated June 23, 1863; Reissue No. 2,011, dated June 27, 1865.

*To all whom it may concern:*

Be it known that I, JACOB B. CROWELL, of Greencastle, in the county of Franklin and State of Pennsylvania, have invented a new and useful Improvement in Guano Attachments to Wheat-Drills; and I do hereby declare that the following is a full and exact description thereof, reference being had to the accompanying drawings, and to the letters of reference marked thereon.

My invention consists of a rock-shaft working in a concave trough, and also in certain peculiar devices and arrangements connected therewith for sowing guano.

In the accompanying drawings, Figure is a top view of a double trough for wheat and guano with my improvements attached. Fig. 2 is a cross-section through the concave hopper and the rock-shaft detached from the machine. Fig. 3 is a view of the stirrup-shaped wipers, with part of the rock-shaft.

My machine is constructed with a double hopper for sowing wheat and guano at the same time, as seen in Fig. 1 at A B, the division A being intended for wheat or grain and the division B for guano and other fertilizers. The hopper B is provided with a horizontal rock-shaft, C, which is armed with two sets of spikes or stirrers, G and G′, and a set of wipers or stirrups, D. The stirrers G on the under side of the rock-shaft are flattened in order better to push the fertilizer down into the bottom of the hopper. At every feed-hole or discharge-opening in the bottom of the hopper B is a stirrup-shaped wiper attached to the rock-shaft C so as to swing back and forth across the feed-openings S, Fig. 2, and up the sides of the hopper, as indicated in red lines. A side view of one of these stirrups is seen in Fig. 3. Both the stirrups and spikes may be cheaply made of wire. One of these spikes is placed each side of a stirrup, just opposite the center of the loop of the stirrup or wiper. The upper spikes, G′, swing down the sides of the hopper to the point reached by the stirrups or wipers at every stroke of the rock-shaft C. By this arrangement the feeding is very complete, the spikes preventing any arching above or around the rock-shaft, the flat spikes carrying the fertilizer down to the bottom of the hopper, and the stirrup-shaped wipers pressing it through the feed-holes. The feed-slide I, Fig. 2, regulates the discharge of the guano or other fertilizer, the same being worked by the lever R in the usual manner, so as to make the feed-holes larger or smaller or close them at pleasure. This slide I works close up to the metallic plate H, Fig. 2, so as to leave no room for clogging between the slide and wiper D, Fig. 2, (seen in cross-section,) in the feed-hole S. The action of the wiper D (seen is cross-section, Fig. 2) keeps the metallic plate or hopper-bottom H bright and clean, and the plate, being thin, gives no room for the guano to adhere to the sides of the feed-hole, as will happen with a wooden bottom in the hopper, especially if the guano is damp and adhesive. The shaft K and crank L are not employed in the full-sized machine.

The wheel M may be a cog-wheel, to which the pitman N may be attached, motion being given by the traveling wheels of the machine. The pitman N being attached to crank O, motion is communicated to the latter. This crank is connected to the axle C by means of a loose collar, which may be fixed by means of a clutch, P, operated or moved by a lever, Q, thus fixing the crank O at pleasure.

When the rock-shaft is in operation not only the wipers D, but also two sets of spikes, are carried past the feed-holes at every backward and every forward motion of the rock-shaft C; or six strokes of these feeders pass the feed-holes at every revolution of the axle K.

A very important advantage of my machine is derived from the reciprocating action of the rock-shaft and the consequent sudden jar from the change of motion. This reverse or rocking motion shakes the guano or other fertilizer from the shaft C and from the spikes G G′ and wipers D, and thus prevents the clogging that might occur if the shaft and spikes were revolved constantly in one direction.

I am aware that perpendicular rollers or shafts have been worked backward and forward through partial revolutions for agitating guano in a hopper; but I believe a horizontal rock-shaft armed with spikes and wipers, as above described, is new and has never been used in feeding guano from a hopper previous to my invention.

I do not broadly claim a horizontal rock-shaft or the other separate mechanical devices employed in my machine.

Having thus fully described my invention, what I claim, and desire to secure by Letters Patent of the United States, is—

1. A horizontal rock-shaft provided with stirrers G and wipers D, substantially as set forth.

2. A horizontal rock-shaft, when armed with spikes or stirrers G′ on the upper side of the shaft, substantially as specified.

3. The horizontal rock-shaft, in combination with the curved metallic bottom of the hopper, substantially as described.

4. So arranging and operating a rock-shaft that the spikes or stirrers on the upper side of the shaft will prevent the arching of the guano and bring the same down to a point reached by the stirrers on the under side of the rock-shaft, and thus agitate and feed down the entire mass of the guano in the hopper, substantially as specified.

5. The above-described construction and arrangement of the rock-shaft, in connection with the clutch P, crank O, and pitman N, all operated substantially in the manner and for the purposes set forth.

JACOB B. CROWELL.

Witnesses:
DANIEL BREED,
ABRAHAM HUFFER.